(12) United States Patent
Hollenbeck et al.

(10) Patent No.: US 10,113,857 B2
(45) Date of Patent: Oct. 30, 2018

(54) SELECTIVE AMPLIFICATION OF OPTICAL COHERENCE TOMOGRAPHY SIGNALS

(71) Applicant: 3SHAPE A/S, Copenhagen K (DK)

(72) Inventors: Karl-Josef Hollenbeck, Copenhagen (DK); Onur Kaya, Copenhagen (DK); Ashwani Kumard, Copenhagen (DK)

(73) Assignee: 3Shape A/S, Copenhagen K (DK)

( * ) Notice: Subject to any disclaimer, the term of this patent is extended or adjusted under 35 U.S.C. 154(b) by 0 days.

(21) Appl. No.: 15/054,745

(22) Filed: Feb. 26, 2016

(65) Prior Publication Data

US 2016/0252340 A1 Sep. 1, 2016

(30) Foreign Application Priority Data

Feb. 27, 2015 (DK) .................. 2015 70113

(51) Int. Cl.
*G01B 9/02* (2006.01)
(52) U.S. Cl.
CPC ..... *G01B 9/02091* (2013.01); *G01B 9/02004* (2013.01); *G01B 9/02084* (2013.01)
(58) Field of Classification Search
CPC ............ G01B 9/02004; G01B 9/02091; G01B 9/02027
USPC .................................. 356/479, 497
See application file for complete search history.

(56) References Cited

U.S. PATENT DOCUMENTS

| | | | |
|---|---|---|---|
| 7,181,267 B2 | 2/2007 | Barbato | |
| 7,468,997 B2 | 12/2008 | Jayaraman | |
| 2010/0210952 A1 | 8/2010 | Taira et al. | |
| 2014/0028997 A1* | 1/2014 | Cable | G01B 9/02091 356/51 |
| 2014/0078512 A1 | 3/2014 | Kang et al. | |
| 2015/0049340 A1* | 2/2015 | Schneider | G01B 9/02091 356/479 |

OTHER PUBLICATIONS

Michael P Minneman, "All-Semiconductor High-Speed Akinetic Swept-Source for OCT", Nov. 23, 2011, SPIE Optical Sensors and Biophotonics III, vol. 8311, p. 1-10.*
Eigenwillig et al.: "K-space linear Fourier domain mode locked laser and applications for optical coherence tomography," Optics Express, vol. 16, No. 12, Jun. 9, 2008, pp. 8916-8937.

(Continued)

*Primary Examiner* — Jonathan Hansen
(74) *Attorney, Agent, or Firm* — Buchanan Ingersoll & Rooney PC

(57) ABSTRACT

Presented is an optical coherence tomography system and method to increase imaging depth of optical coherence tomography (OCT) by selective amplification. In a swept-source OCT system with periodically linear wavenumber-vs-time characteristic, the signal in principle is summation of various sinusoidal signals with different frequencies. Each frequency component of the recorded signal carries reflectivity information for a certain depth of the analyzed object. At greater depth inside the analyzed object, the reflectivity information is generally weak due absorption and scattering. An analog or digital electronic circuit selectively filters and amplifies frequencies above some threshold, possibly up to another threshold. In this way, even small signals for relatively larger depths become detectable.

18 Claims, 8 Drawing Sheets

(56) References Cited

OTHER PUBLICATIONS

Vergnole et al.: "Experimental validation of an optimized signal processing method to handle non-linearity in swept-source optical coherence tomography," Optics Express, vol. 18, No. 10, May 10, 2010, pp. 10446-10461.

Minneman et al.: "All-Semiconductor High-Speed Akinetic Swept-Source for OCT," Proc. of SPIE-OSA-IEEE Asia Communications and Photonics, vol. 8311, pp. 1-10, 2011.

Search Report issued by the Danish Patent Office in corresponding Danish Patent Application No. PA 2015 70113 dated Sep. 22, 2015 (4 pages).

* cited by examiner

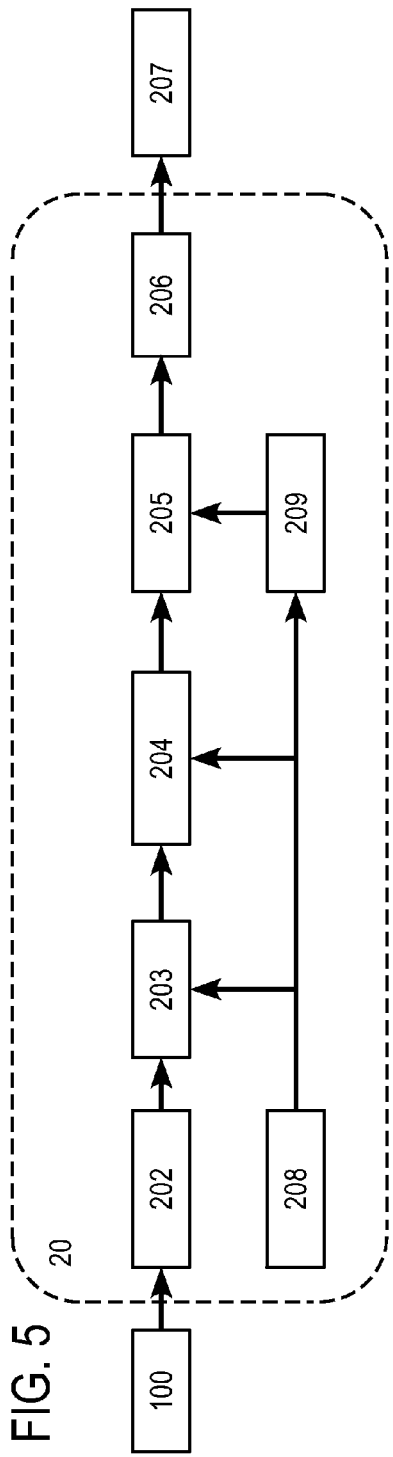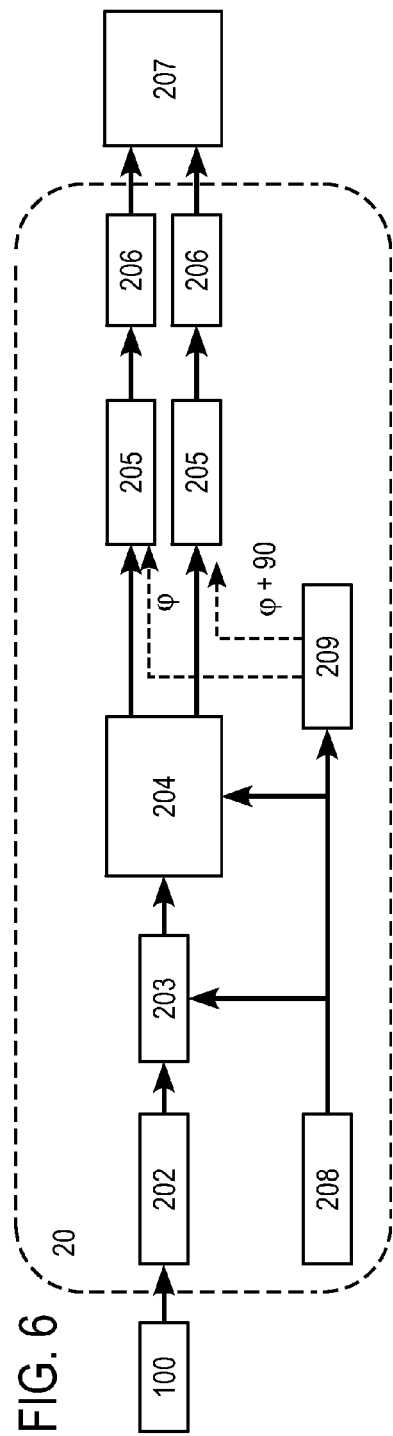
FIG. 5
FIG. 6

SELECTIVE AMPLIFICATION OF OPTICAL COHERENCE TOMOGRAPHY SIGNALS

TECHNICAL FIELD

The present invention relates to optical coherence tomography (OCT), where filtering and amplification is used to increase imaging depth. The invention is particularly useful in swept-source OCT, and particularly when the swept laser has a linear wavenumber-vs-time characteristic.

BACKGROUND

OCT is an optical imaging technique which offers non-invasive, cross-sectional imaging of analyzed objects, such as biological tissue. OCT is basically an interferometric technique where the light source is divided into two parts, a reference beam of light propagating in a reference arm and probe beam of light propagating in a sample arm of the interferometric system. The light of the probe beam which is back-scattered from the analyzed object interferes with light of the reference beam reflected from a reflective element in the reference arm and this interference signal produces reflectivity-over-depth information for the analyzed object. Some background information on OCT can, e.g., be found in US 20140078512.

An OCT system generally has a photo-detector, often a balanced one, to record the strength of the interference signal for a range of frequencies, where a characteristic frequency can be mapped directly to an optical path length. Typically, the detector output is converted to a digital signal. These data are then Fourier transformed to reveal reflectivity as a function of optical path length or equivalently depth, which is called an A scan.

Inside absorptive or scattering media, absolute reflectivity becomes small typically at depths of only 1 to 2 mm. At the same time, the reflectivity from the first surface is typically high. This first-surface signal will typically saturate the photo-detector, and hence any frequencies corresponding to higher depths will become undetectable after digitization with a finite bit depth.

There is thus a strong need for OCT systems with greater imaging depths.

SUMMARY

Disclosed is a swept-source optical coherence tomography system for recording sub-surface structure of an analyzed object, said optical coherence tomography system comprising:

a swept light source configured for generating coherent light with a wavenumber varying with time;

an interferometric system configured for splitting the generated light onto a reference arm and a sample arm, where the sample arm is for projecting light onto and receiving light from the analyzed object, and where the received light interferes with light returning from the reference arm to produce an interference signal;

a photo-detector configured for recording a photo-detector signal in response to the interference signal;

a signal processing unit configured for selectively amplifying a high wavenumber part of the recorded photo-detector signal and for generating a digitized signal from the selectively amplified photo-detector signal; and a data processing unit configured for calculation of at least one A scan from the digitized signal.

Disclosed is a method for obtaining an A scan of an analyzed object using swept-source optical coherence tomography, said method comprising:

generating swept-wavenumber light and splitting the light into a sample arm and a reference arm;

projecting a probe beam of the generated light onto the analyzed object and receiving light reflected from the analyzed object using the sample arm;

producing an interference signal by providing that the received light interferes with light returning from the reference arm;

using a photo-detector to record a photo-detector signal in response to the interference signal;

selectively amplifying the high wavenumber part of the recorded photo-detector signal and generating a digitized signal from the selectively amplified photo-detector signal; and calculating at least one A scan from the digitized signal.

Disclosed is apparatus for swept-source optical coherence tomography comprising:

a swept-source configured for generating light with a wavenumber varying with time;

a beam splitter for splitting said generated light into a reference and a sample arm;

an optical system for projecting a probe beam from the sample arm onto an analyzed object and for receiving light of the probe beam reflected from the analyzed object;

a photo-detector configured for providing a photo-detector signal in response to the received light;

an analog processing unit configured for analog processing of the photo-detector signal, where the analog processing unit comprises at least one tunable band pass filter and at least one variable gain amplifier;

a digitizer configured for digitizing the analog processed photo-detector signal; and a data processing unit configured for calculation of at least one A scan from the digitized signal.

Disclosed is also a method for obtaining an A scan of an analyzed object using swept-source optical coherence tomography, said method comprising:

generating swept-wavenumber light and splitting the light into a sample arm and a reference arm;

projecting a light beam from the sample arm onto the analyzed object;

using a photo-detector to sample light that is reflected from the analyzed object;

analog processing of a signal from the photo-detector using an analog processing unit comprising at least one tunable band pass filter and at least one variable gain amplifier;

digitizing the analog processed photo-detector signal; and calculating at least one A scan from the digitized signal.

In some embodiments, the signal processing unit comprises an analog processing unit configured for analog processing of the photo-detector signal, where the analog processing unit comprises at least one tunable band pass or high pass filter and at least one variable gain amplifier.

In some embodiments, the signal processing unit comprises a digitizer configured for digitizing the analog processed photo-detector signal.

In some embodiments, selectively amplifying comprises analog processing of the recorded photo-detector signal using an analog processing unit comprising at least one tunable band pass or high pass filter and at least one variable gain amplifier, and digitizing the analog processed photo-detector signal.

With the present invention, weak optical coherence tomography signals corresponding to relatively large imaging depths become detectable. When selectively amplifying a high wavenumber part of the recorded photo-detector signal, i.e. selectively amplifying the part of the recorded photo-detector signal corresponding to a high wavenumber part of the received light, the signal from the deeper parts of the sample is enhanced such that the imaging depth of the OCT system is increased.

Selective amplification in the sense of this invention is a sequence of frequency filtering and amplification. A filter can be digital or analog. A filter in this invention cuts off low frequencies, i.e., a high pass filter. It may be advantageous not to amplify all high frequencies, particularly not those exceeding the sampling frequency, because they may contain noise and cannot be detected anyhow. Particularly in this situation, it may be advantageous to use one or more band pass filters rather than one or more high pass filters.

Digital filters can be any order. It is often difficult to attain a desired amplitude response without sacrificing a small group delay. One way to deal with this is to design a block which meets the amplitude response requirements, and then to add an all-pass block that corrects the group-delay without affecting the amplitude response. An alternative to a high order all-pass section is to make a digital filter with an inverse characteristic.

A high pass filter is described here by its corner frequency, also known as cutoff frequency. It is understood that there is no perfectly sharp cutoff in frequency response in actual filters.

Selective amplification in conjunction with Optical Coherence Domain Reflectometry (OCDR) is described in U.S. Pat. No. 7,181,267. Here, the frequency of the probing light is modulated in a series of modulators, and one or preferably many tuners can be used to detect the same frequencies in the recorded signal. The present invention, in contrast, does not modulate light frequencies. Furthermore, the present invention does not require a discrete set of frequencies to be amplified.

The light used in this invention can be visible, infrared, or within any other wavelength, wavenumber or frequency range.

The swept light source may be a swept-source laser configured for generating the light with time-dependent wavenumber.

In some embodiments, the swept light source comprises a laser that has an at least approximately periodically linear wavenumber-vs-time characteristic.

This invention exploits a mathematical analysis that shows that the interference signal is a sum of sinusoidals when the swept light source has a periodically linear wavenumber-vs-time characteristic. Akinetic lasers (i.e. lasers where the wavenumber changes periodically linearly with time) are thus particularly useful with this invention.

Current akinetic lasers cannot achieve a perfectly linear wavenumber-vs-time characteristic, because some wave number transitions take longer time than others. However, especially when the wave number change per transition is small, there are only a few such imperfect transitions, on the order of 3-5%. Furthermore, the time for all wave number transitions is often known from a laser calibration step. If the signal is stable between transitions, the filter effect can be recovered almost perfectly.

A sinusoidal in the sense of this invention can be a sine or cosine function.

Laser with a cavity with tunable length such as VCSELs (e.g., U.S. Pat. No. 7,468,997) can achieve an approximately periodically linear wavenumber-vs-time characteristic for small tuning frequencies. For higher frequencies, especially when the cavity mirror oscillates, the OCT signal that will display a characteristic step in the Fourier transformed data for every reflective surface in the analyzed object. With the present invention, such a step can be more clearly identified than without high pass or band pass filtering and amplification, but some smearing will have to be expected if the signal is not a pure sinusoidal and because of a finite sampling resolution.

Because of absorption and scattering, sinusoidals with relatively lower frequency, i.e., corresponding to shallow depths, dominate in the sum that is the recorded intensity signal. Consequently, sinusoidals with relatively higher frequency, i.e., corresponding to greater depths, are hardly detectable in a Fourier transform of the detector signal. With the present invention, different frequencies corresponding to different layers of the analyzed object are extracted and amplified separately, such that other frequencies cannot dominate the overall signal.

As opposed to several standard OCT system, the digitization can be performed after the analog processing of the photodetector signal, not immediately of the photodetector signal. Said analog-to-digital conversion typically has 12 bits at most, i.e., only 4096 discrete values. By selectively filtering and amplifying different frequencies, a full dynamic range can be exploited for each frequencies or narrow window of frequencies rather than having to cover all frequencies' combined signal. The advantage of the present invention is thus that the dynamic range of the analog-to-digital conversion is no longer limiting the relative detectability of shallow and deeper layers in the analyzed object.

Subsequent to digitization a data processing can be used to compute an A scan representing reflectivity over depth. One way to compute an A scan is by a set of Fourier transforms of observed amplified intensity for each window of frequencies following from the band pass filtering. A Fourier transform can performed, e.g., in dedicated electronics such as an FPGA or using a PC, here either on the CPU or on one or multiple GPUs.

The output from the Fourier transform can be element-wise squared to obtain a power spectrum. Also an inverse Fourier transform can be element-wise squared to obtain a power spectrum as it will differ only by a factor from the forward transforms' result. Algorithms for Fourier transforms, especially fast Fourier transforms, are widely known in the art.

In general in OCT systems, it is not the goal to find absolute values of reflectivity, but rather to create an image that best indicates contrasts between reflections from different layers. The A scan output can therefore show reflectivity after contrast enhancement by some non-linear transformation, correction for geometrical distortions, or some other image processing. Display means for data originating from OCT devices are widely known in the art.

If the OCT system uses a tunable band pass filter with a narrow frequency window, it may not be needed to compute any Fourier transform, because in the limit of a zero-width window, the recorded intensity has a single sinusoidal of which only the amplitude or equivalently power needs to be detected. The choice of number of mid-point frequencies, window width, and whether to perform Fourier transforms will typically depend on the object of interest and desired imaging depth.

An A scan can be computed as a weighted sum of all Fourier transforms or power spectra or digitized amplitude values, whatever is applicable, where weights are inversely related to amplifier gain.

Accordingly, in some embodiments the data processing unit is configured for computing the at least one A scan as a weighted sum of Fourier transforms of the digitized signal.

It can also be advantageous to weight the individual Fourier transforms or power spectra in some arbitrary way, for example as to maximize visual contrast within a depth region of interest.

It can also be advantageous to weight the individual Fourier transforms or power spectra to represent the characteristics of the high pass or band pass filter, with lower but non-zero weight to frequency regions where the filter is not perfect.

The series or continuum of band pass filter window mid-point frequencies or high pass filter corner frequencies will generally be chosen within the range of OCT frequencies to be expected in a given analyzed object and for a given OCT system.

The tunable band pass or high pass filter can be applied prior to the variable gain amplifier, or vice versa.

In some embodiments the data processing unit is configured for computing the at least one A scan as a weighted series of readings of the digitized signal.

In some embodiments the weights are determined from gain values of the variable gain amplifier.

In some embodiments the optical coherence tomography system comprises a precision amplifier to boost up the photo-detector signal before the photo-detector signal is processed by the signal processing unit, such as before the photo-detector signal is processed by the unit for analog processing. The disclosed method may correspondingly comprise boosting up the photo-detector signal prior to analog processing. In some embodiments, an oscillator, for example a voltage-controlled oscillator, generates a signal with at least approximately the same frequency as the frequency of the band pass filter. Using a frequency modulator (analog multiplier or a mixer), each narrow frequency can be demodulated to a smaller or even zero frequency (DC). This process relieves the specification of the digital processing block and increases the effective number of bits at the output of the analog-to-digital converter.

Demodulation to a near zero frequency can also be helpful in case the system generates a high 1/f noise. The tunable band-pass filter can be tuned rapidly to do this analog processing for the whole spectrum of interest.

In embodiments that use modulation to DC, it is not required to perform any Fourier transform. This approach is still valid approximately if modulation is only close to DC.

Any frequency modulation can be accounted for in the calculation of an A scan, for example exploiting the Fourier shifting theorem.

In some embodiments, the band pass filter is tuned to different mid-point frequencies or equivalently the high pass filter is tuned to different corner frequencies either continuously or sequentially. The tuning is preferably performed by a control unit. An A scan thus takes longer than in the traditional approach of a single Fourier transform.

In some embodiments, the gain of the variable gain amplifier is controlled by a control unit, preferable the same control unit that also tunes the band pass or high pass filter. The control unit can set the mid-point frequencies to a discrete set of values or continuously adjust the frequency in a sweep.

In some embodiments, the control unit controls the frequency modulator such that it can attain a small modulated frequency fully or nearly independent of band pass filter mid-point frequency.

The control unit may also control the digitization. For example, the control unit may save information to simplify the attribution of digitization readings to filter mid-point frequencies, modulation frequencies, and amplifier gain at each frequency, for example by assigning time stamps.

In some embodiments, the optical coherence tomography system comprises multiple pairs of band pass filters and/or high pass filters and variable-gain amplifiers, with all pairs operating in parallel.

A bank of band pass and/or high pass filters and variable-gain amplifiers may operate in parallel, accelerating the acquisition of an A scan. In a sequential embodiment, the narrower the band pass filter window or equivalently the closer the corner frequencies of high pass filters, the longer the acquisition time. In a parallel embodiment, the narrower the band pass filters' windows or equivalently the closer the corner frequencies of several high pass filters, the more filter and amplifiers are needed in the bank.

An embodiment of this invention may also contain a movable mirror such as a MEMS mirror to guide the sampling beam and thus acquire B and possibly also C scans.

In some embodiments the interferometric system comprises a beam splitter for splitting the generated light into the reference arm and the sample arm.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIGS. 5, 6 and 7 show embodiments of the unit for analog processing.

DETAILED DESCRIPTION

Mathematical Principle

A very simple OCT system can serve to demonstrate that given a laser with linear wavenumber-vs-time characteristic, observed intensity will be a sinusoidal or sum of sinusoidals, and hence suitable for analog processing according to this invention.

Figure 1:
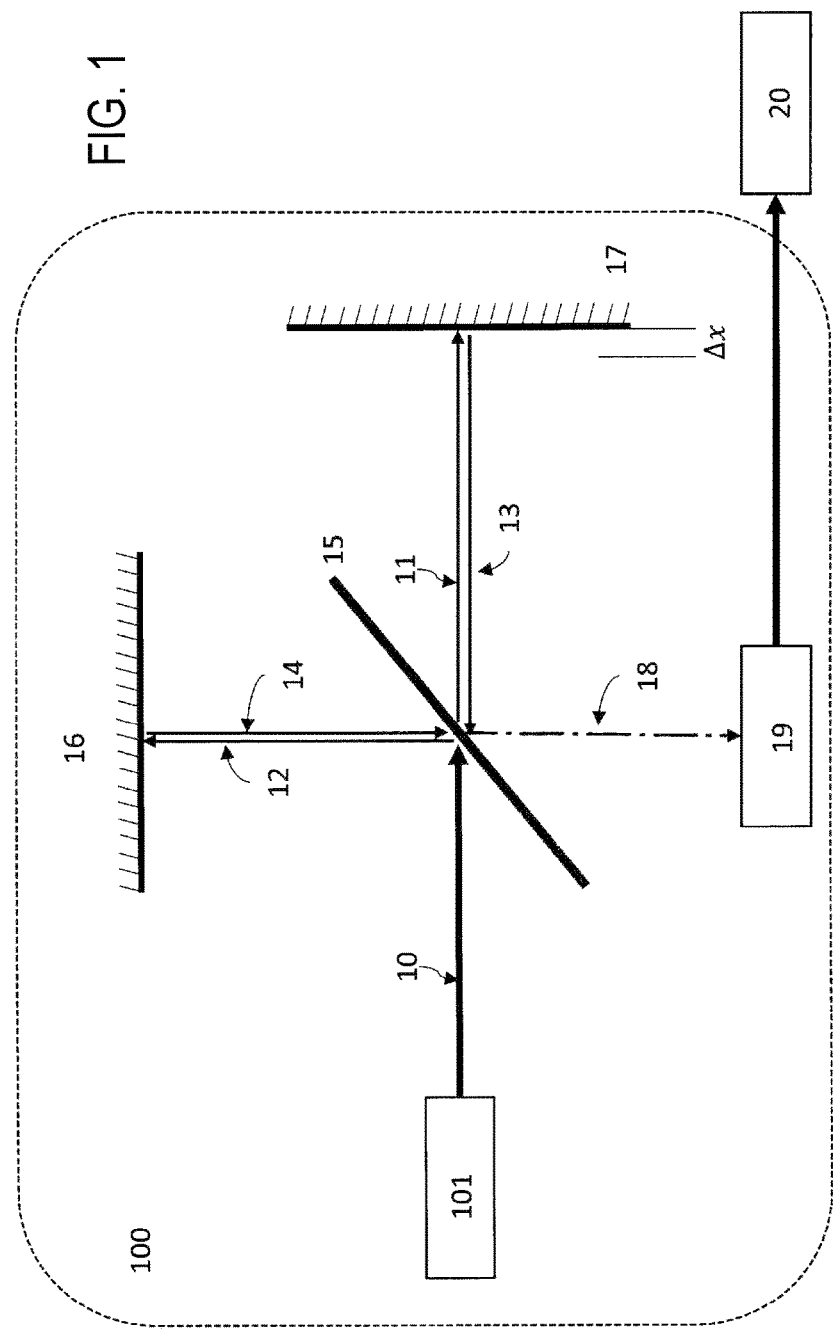
FIG. 1 shows a configuration of a simple OCT system.

The very simple OCT system in FIG. 1 is composed of a swept-source laser 101, and an interferometric system with a beam splitter 15, a photo-detector 19, and a reference arm with mirror 16. It can analyze an object 17 with at least one reflective surface. The swept-source laser 101 emits a laser beam 10, which is divided by the beam-splitter 15 into probe beam 11 and reference beam 12. The reflected reference beam 14 and probe beam 13 reflected from the object produce an interference signal 18 at the detector 19. The detector 19 output is connected to the unit for analog processing 20 presented as various embodiments in this document. Typically, some analog-to-digital conversion and digital data processing and visualization will occur beyond the unit for analog processing 20. All elements within the dashed area 100 (thus all except 20) are termed "OCT engine".

At the detector the electric field E is the sum of the fields from the sampled object (S) and reference (R) arms $$E_D = E_S + E_R = E_S e^{i(\phi_s - \omega t)} + E_R e^{-i(\phi_r - \omega t)}$$

Intensity is then $$I_{det} = \langle E_D(t) E^*_{det}(t) \rangle = I_R + I_S + 2\sqrt{I_S I_R} \cos(\phi_R - \phi_S)$$

where the brackets ⟨ ⟩ indicate a time average, taking the time average of $\omega t = 0$ because the detector's integration time is much longer than $1/\omega$.

Assuming an idealized light source whose power spectral density S does not depend on wavenumber, an idealized mirror on the reference arm with power reflectivity $R_R = 1$, a detector with perfect response, a 50:50 beam splitter, and a sample power reflectivity $R_S$ from the analyzed object, the above equation can be written as $$I_D = \frac{S}{2}(1 + R_S) + \frac{S}{2}\sqrt{R_S} \cos(\phi_R - \phi_S)$$

If the mirror 17 is displaced by an optical path length difference $\Delta x$ from the symmetric configuration with reference arm, the phase shift is $$\phi_R - \phi_S = 2k\Delta x$$

This invention is particularly useful in OCT systems with a swept source, where wavenumber k changes periodically linearly with time over a sweep time $t_s$ (akinetic lasers):

$$k = k(t) = k_0 + \Delta k \cdot t/t_s$$

where $\Delta k$ is the range of wavenumbers the laser can produce, and $k_0$ is the wavenumber at the start of a sweep. At the end of a sweep, the next one starts. Without loss of generality and for simplicity, only one period is considered in the derivations.

Intensity is now $$I_D = \frac{S}{2}(1 + R_S) + \frac{S}{2}\sqrt{R_S} \cos(2k_0 \Delta x + 2\Delta k \Delta x \cdot t/t_s)$$

As can be seen, there is one pure sinusoidal oscillation with an amplitude that is proportional to $\sqrt{R_S}$ and has an observed OCT frequency $$v_{OCT} = \frac{\Delta k \Delta x}{\pi t_s}$$

Given that all other parameters in the above equation are constant for a given OCT system, and that intensity from the reference arm likewise is constant, every OCT frequency $v_{OCT}$ maps to an optical path length difference $\Delta x$, and a Fourier transform of detector intensity thus reveals the square root of sample reflectivity $\sqrt{R_S}$ for every displacement.

The assumptions in the above derivations are in practice not particularly limiting for OCT imaging applications, because the absolute values of object reflectivity need generally not be known.

Example Embodiment

Figure 3:
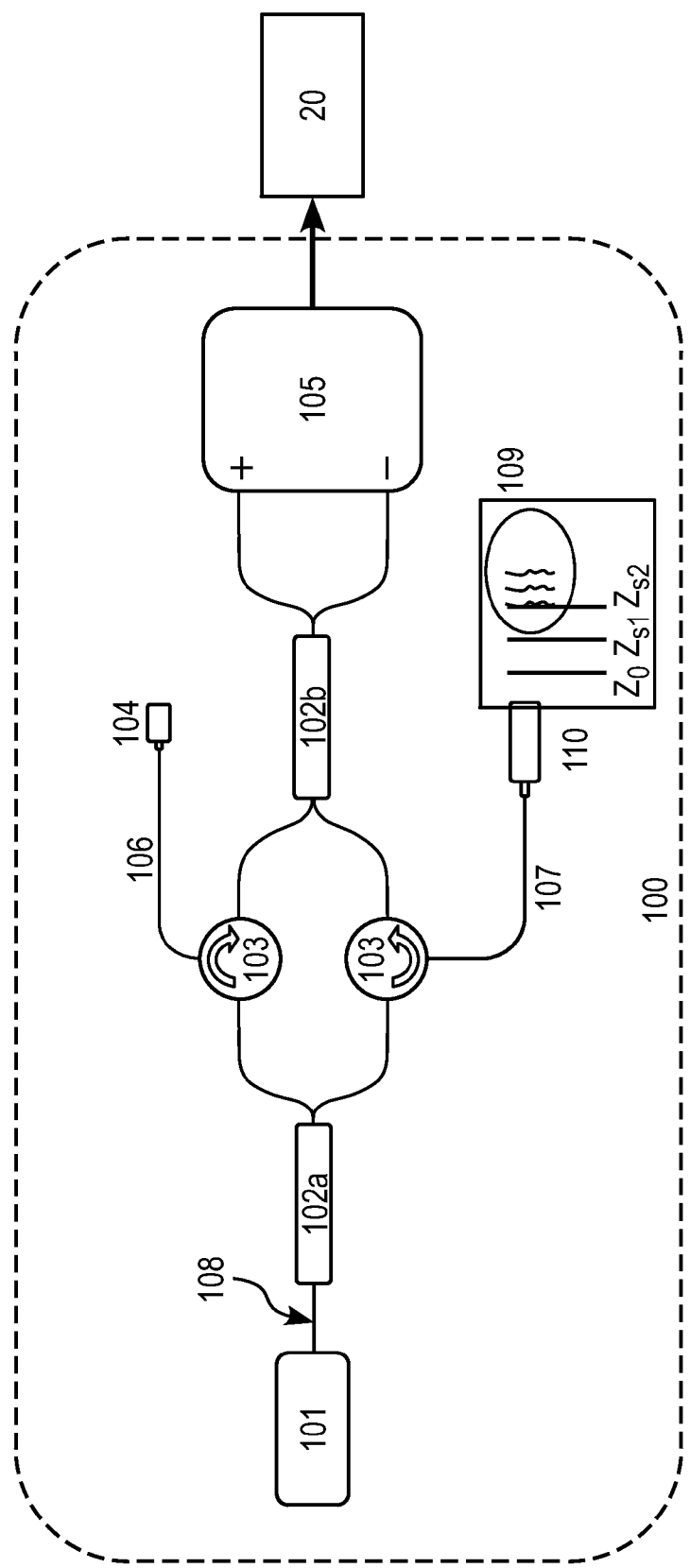
FIG. 3 shows a fiber-based OCT engine.

More advanced OCT engines such as the fiber-based OCT engine 100 shown in FIG. 3 typically include a beam-splitter 102a connected to the laser 101 by a standard fiber 108. The beam-splitter 102a splits the power equally or unequally to direct towards sample arm 107 and reference arm 106 through a fiber-optic circulator 103. For the circulator 103, light input in any given port is coupled out from the port that is next to it in the direction given by the arrow. In the reference arm the laser power is reflected by a retro-reflector 104 and is directed towards the beam-combiner 102b. In the sample arm, some focusing optics 110 focus the light to the analyzed object 109 and also collects the back-scattered light from it, which is then directed to beam-combiner 102b. The interference signal produced at 102b is directed towards a balanced detector 105, which is then directed to a unit for analog processing 20.

An analyzed object 109 may consist of several layers. It will be shown below that also in such a case, the intensity at the detector 105 is a sinusoidal with one OCT frequency, and this OCT frequency depends on depth into an analyzed medium. Hence, this invention can be used with such systems as well.

For simplicity, we consider an analyzed object with discrete reflective surfaces to derive a theoretical expression for the OCT signal at the detector. A continuous reflectivity function could be treated analogously.

The incident wave from the laser is $E_i = s(k,\omega) e^{i(kz - \omega t)}$

Here $s(k,\omega)$ is the electric field amplitude as a function of position z, time t, wavenumber $k = 2\pi/\lambda$, and angular frequency $\omega$. The beam splitter is assumed to have an achromatic (wavelength-independent) power splitting ratio. Without loss of generality, it is here taken as 0.5.

The field incident on the second beam-splitter after returning from the reference through the circulator is given by $$E_R = \frac{s(k,\omega)}{\sqrt{2}} r_R \exp\{i[k(z + 2z_R) - \omega t]\}$$

where $r_R$ is the reference electric field reflectivity and $z_R$ is a path length the light travels in reference arm before reaching the second beam-splitter.

In case of the analyzed object we consider a complex refractive index $\hat{n}_{s_n} = n_{s_n} + i\alpha_{s_n}$ for each discrete layer to account for absorption with coefficient $\alpha$. Also, for a more generic case we need to take $\hat{n}_{s_n}$ as a wavenumber dependent, i.e., as $\hat{n}_{s_n}(k)$.

A monochromatic wave of wavenumber k and optical frequency $\omega$ that travels along z within a homogeneous and isotropic medium of complex refractive index $\hat{n}_{s_n}$ can then be written as (expanding $\hat{n}_{s_n} = n_{s_n} + i\alpha_{s_n}$ in the exponent, so we get a product of two exponentials):

$$E_i(z,t) = s(k,\omega) \exp\{i[kn_{s_n}z - \omega t]\} \exp(-k\alpha_{s_n}z)$$

Going back to the complex notation, the field incident on the second beam splitter after returning from the analyzed object is given by $$E_S = \frac{s(k,\omega)}{\sqrt{2}} \sum_{n=1}^{N} r_{S_n} \exp\left\{i\left[k\left(z + 2\left(z_0 + \sum_{p=0}^{n-1} \hat{n}_{s_p} \Delta z_p\right)\right) - \omega t\right]\right\}$$

Here, $\Delta z_p = (z_{s_{p+1}} - z_{s_p})$, while $\Delta z_0$ denotes how far the object is placed from zero delay, and $r_{s_n}$ is the electric field reflectivity for the n-th layer of the object.

Substituting the complex expression of $\hat{n}_{s_n} = n_{s_n} + i\alpha_{s_n}$ above, $$E_S = \frac{s(k,\omega)}{\sqrt{2}} \sum_{n=1}^{N} r_{s_n} e^{-2k\sum_{p=0}^{n-1} \alpha_{s_p} \Delta z_p} \exp\left\{i\left[k\left(z + 2\left(z_0 + \sum_{p=0}^{n-1} n_{s_p} \Delta z_p\right)\right) - \omega t\right]\right\}$$

Here, $z_{s_n}$ is the location of $n^{th}$ layer, $z_0$ is zero-delay position and $n_{s_0} = 1$ and $\alpha_{s_0} = 0$ because we have air before the first surface.

Figure 4:
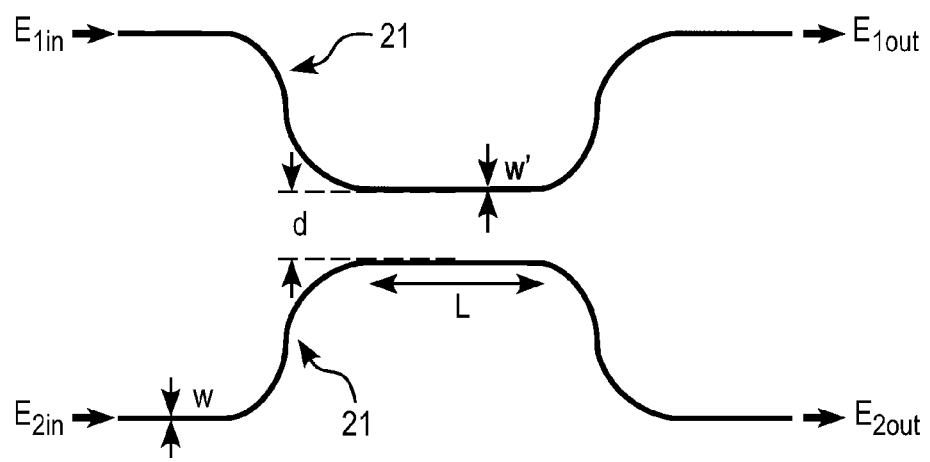
FIG. 4 shows an optical 2×2 directional coupler

In a multi-layer consideration as in present case the amplitude of the incident field reflected from a particular interface will also be affected by reflectivities of all previous interfaces along with the absorption in each layer. One can account for the effective amplitude attenuation as the beam propagated through the different layers of an absorbing object by introducing a reduced amplitude reflectivity:

$$r'_{s_n} = \prod_{p=0}^{n-1} e^{-2k\alpha_{s_p}\Delta z_p}, \sigma_p r_{s_n}$$

where $\sigma^p$ is amplitude transmission of p-th interface. It is related to coefficient of corresponding interface via $|\sigma_p|^2 = 1 - |r_p|^2$ The two beams $E_R$ and $E_S$ pass through the second beam-splitter to interfere and then split into two channels which is fed into a balanced-detector. Directional couplers are important components in a fiber based OCT system. They are used to split/combine light in the OCT system. A 2×2 directional coupler (DC) with two optical waveguides 21 as shown in FIG. 4 delivers the interference signal split in equal halves to a balanced photo detector.

We assume two electric fields $E_{1in}$ and $E_{2in}$ which have a relative phase difference as the input to the DC. These electric fields correspond to the signal obtained from the reference arm 106 and the sample arm 107 of an OCT engine 100. The phase difference is introduced since the light in the sample arm traverse a different effective optical path length with respect to the reference arm due to a finite thickness of the analyzed object. The two input fields in this case are:

$$E_{1in} = E_R \text{ and } E_{2in} = E_S$$

The output of the DC could be expressed using a transfer matrix M where the relation is, $$\begin{bmatrix} E_{1out} \\ E_{2out} \end{bmatrix} = M \begin{bmatrix} E_{1in} \\ E_{2in} \end{bmatrix}$$

where $$M = \begin{bmatrix} \cos(\delta L_{eff}) - iQ\sin(\delta L_{eff}) & -iS\sin(\delta L_{eff}) \\ -iS\sin(\delta L_{eff}) & \cos(\delta L_{eff}) + iQ\sin(\delta L_{eff}) \end{bmatrix}$$

where $$\delta = \sqrt{\left[\frac{\beta_1 - \beta_2}{2}\right]^2 + \kappa^2},$$

-continued $$Q = \frac{\beta_1 - \beta_2}{2\delta} \text{ and } S = \kappa/\delta$$

Here, $\kappa$ is the coupling constant, $\beta_1$ and $\beta_2$ are the propagation constants in the two waveguides. $\kappa$ is defined as $$\sqrt{\frac{2\Delta}{a}} A \frac{u^2}{\gamma^3} \frac{K_0\left(\frac{wd}{a}\right)}{K_1^2(w)}$$

In the present case, we assume that two optical waveguides 21 are identical, which means $\beta_1 = \beta_2$. Due to the 50:50 split, $\kappa L_{eff} = \pi/4$.

With these assumptions, we have the new matrix as $$M = \frac{1}{\sqrt{2}} \begin{bmatrix} 1 & -i \\ -i & 1 \end{bmatrix}$$

Using this matrix we calculate the output fields at two channels of the 2×2 splitter.

$$\begin{bmatrix} E_{1out} \\ E_{2out} \end{bmatrix} = \frac{s(k,\omega)}{2} \begin{bmatrix} 1 & -i \\ -i & 1 \end{bmatrix} \begin{bmatrix} r_R \exp\{i[k(z+2z_R) - \omega t]\} \\ \sum_{n=1}^{N} r'_{s_n} \exp\{i[k(z+2z'_{s_n}) - \omega t]\} \end{bmatrix}$$

Where we have substituted $z'_{s_n} = z_0 + \sum_{p=0}^{n-1} n_{s_p} \Delta z_p$.

Multiplying the above matrix together, we have following expression for output fields.

$$E_{1out} = \frac{s(k,\omega)}{2} \left[ r_R \exp\{i[k(z+2z_R) - \omega t]\} - i\sum_{n=1}^{N} r'_{s_n} \exp\{i[k(z+2z'_{s_n}) - \omega t]\} \right]$$

$$E_{2out} = \frac{s(k,\omega)}{2}$$

$$\left[ -ir_R \exp\{i[k(z+2z_R) - \omega t]\} + \sum_{n=1}^{N} r'_{s_n} \exp\{i[k(z+2z'_{s_n}) - \omega t]\} \right]$$

This will generate a photo-current proportional to the square sum of the field incident upon the detector, given by $$I_{1out}(k,\omega) = \frac{\rho}{2}\langle |E_{1out}|^2 \rangle = \frac{\rho}{2}\langle (E_{1out})(E_{1out})^* \rangle$$

$$I_{2out}(k,\omega) = \frac{\rho}{2}\langle |E_{2out}|^2 \rangle = \frac{\rho}{2}\langle (E_{2out})(E_{2out})^* \rangle$$

where the brackets indicate a time average and p is the responsivity of the detector [A/W].

We take z=0 at the beam-splitter and expand for the detector current, taking the time average of $\omega t=0$ (because the detector's integration time is much longer than $1/\omega$). With $S(k) = \langle |s(k,\omega)|^2 \rangle$ and simplifying the balanced detector current can then be written as:

$$I_{BD}(k) = I_{2out}(k) - I_{1out}(k) =$$

$$\frac{\rho}{2}\frac{S(k)}{4}\left[2i\sum_{n=1}^{N} r_R r'_{s_n} e^{-i2k(z_R-z'_{s_n})} - 2i\sum_{n=1}^{N} r_R r'_{s_n} e^{i2k(z_R-z'_{s_n})}\right]$$

Using the identity $$\sin(x) = \frac{1}{2}ie^{-ix} - \frac{1}{2}ie^{ix},$$

we have $$I_{BD}(k) = \frac{\rho}{2}\left[S(k)\sum_{n=1}^{N} r_R r'_{s_n} \sin[2k(z_R - z'_{s_n})]\right]$$

Assuming a periodically linear wavenumber-vs-time, characteristic $$k = k(t) = k_0 + \Delta k \cdot t/t_s$$

and neglecting any variability of source power with wavenumber $$I_{BD}(t) = \frac{\rho}{2}\left[S\sum_{n=1}^{N} r_R r'_{s_n} \sin[2(k_0 + \Delta k \cdot t/t_s)(z_R - z'_{s_n})]\right]$$

The obtained $I_{BD}(t)$ is thus again a sum of sinusoidals, where each sinusoidal has an OCT frequency that is a function of the depth that is imaged and an amplitude proportional to a reflectivity from that depth. Hence, the signal is well suited for this invention.

Figure 2:
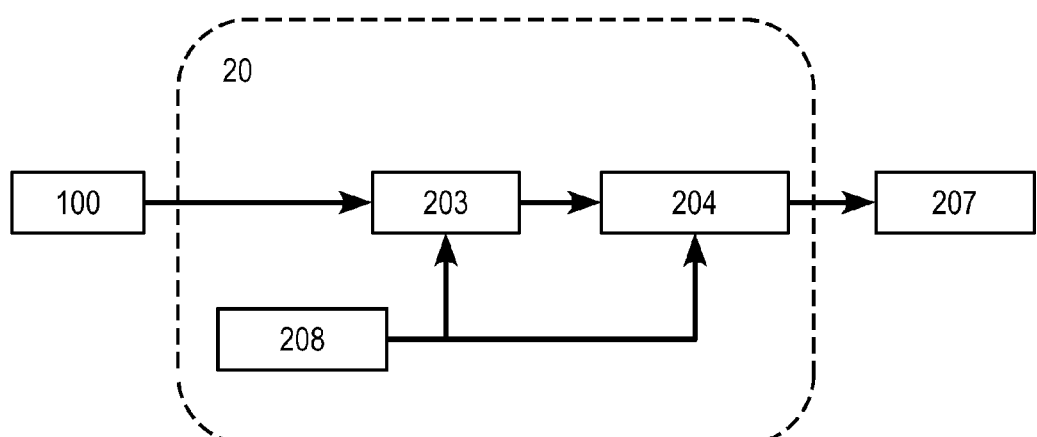
FIG. 2 shows an embodiment of the unit for analog processing.

In a basic embodiment shown in FIG. 2, the unit for analog processing 20 of the detected intensity $I_{BD}(t)$ or equivalently $I_{BD}(k)$ comprises a tunable band pass filter 203 and a variable gain amplifier 204, both controlled by a control unit 208, in a stage after the OCT engine 100, but before the analog-to-digital conversion 207. Together the unit for analog processing 20 and the unit for analog-to-digital conversion 207 provide a signal processing unit capable of selectively amplifying a high wavenumber part of the recorded photo-detector signal and generating a digitized signal from the selectively amplified photo-detector signal. The band pass filter has a frequency window that is narrower than the range of OCT frequencies to be expected from a given analyzed object. For each of a series or continuum of window mid-point frequencies, as set by the control unit 208, the detector signal is recorded. The amplifier gain is preferably adjusted by the control unit 208 such as to maximize the useful dynamic range of the analog-to-digital conversion for every window mid-point frequency. The recorded interference signal is digitized by the converter 207 (e.g., AlazarTech ATS9360).

Denoting the output of the unit for analog processing as $I_{BD}'(k)$, and with, e.g., $n_F$ discrete values of band pass filter midpoint frequencies, an A scan A can be computed as $$A(z) = \sum_{i=0}^{n_F} w_i P(I'_{BD_i}(k))$$

where P indicates power spectrum as obtained via a Fourier transform. Assuming that the amplifier variable gain $g_i$ was adjusted for each setting of the band pass filter such that the observed value of $I_{BD}'_i$ was the same, an possible choice for the weights would be $w_i=1/g_i$. Note that for the summation to be appropriate, it is here assumed that all $I_{BD}'_i$ were sampled for the same range of k, typically the laser's range $\Delta k$.

FIG. 5 shows a more elaborate unit for analog processing 20. The output of the OCT engine 100 is fed into a low noise broadband amplifier 202 (e.g., Texas Instruments THS4022) prior to other analog processing. The tunable band pass filter 203 has a frequency window that is much narrower than the range of OCT frequencies to be expected from a given analyzed object (e.g., PoleZero Mini-Pole Series). A variable gain amplifier 204 is used because as the frequency selected by the band-pass filter moves to higher frequencies the amplitude decreases and hence the gain of 204 can be adjusted accordingly. The variable gain amplifier 204 can be controlled by an analog voltage (e.g., Linear Technology LTC6412) or a digital signal (e.g., Linear Technology LT5554). Using a frequency mixer 205 (e.g., Mini Circuits ZAD-3+), each narrow frequency selected by band-pass filter 203 can be demodulated to a smaller (e.g., 100 kHz) or even zero frequency (DC). A low pass filter 206 (e.g., Linear Technology LTC1563) is then used to reject all the frequency components above the output of mixer 205. The control unit 208 is used to control the band-pass filter 203, variable gain amplifier 204 and the oscillator 209.

The demodulated signal will generally not need to be Fourier transformed in this embodiment, certainly not if demodulation is to DC. If a Fourier transform is used nonetheless, it must correct for the frequency demodulation.

FIG. 6 shows another example unit for analog processing 20, where the oscillator 209 is made to generate two signals which are out of phase by 90°. The output of variable gain amplifier 204 is split into two parallel channels and each channel is mixed with the two signals generated by the oscillator 209. This way the phase related loss of power can be compensated. The output of low pass filter 206 of the two parallel channels is fed into an analog to digital converter 207.

Figure 7:
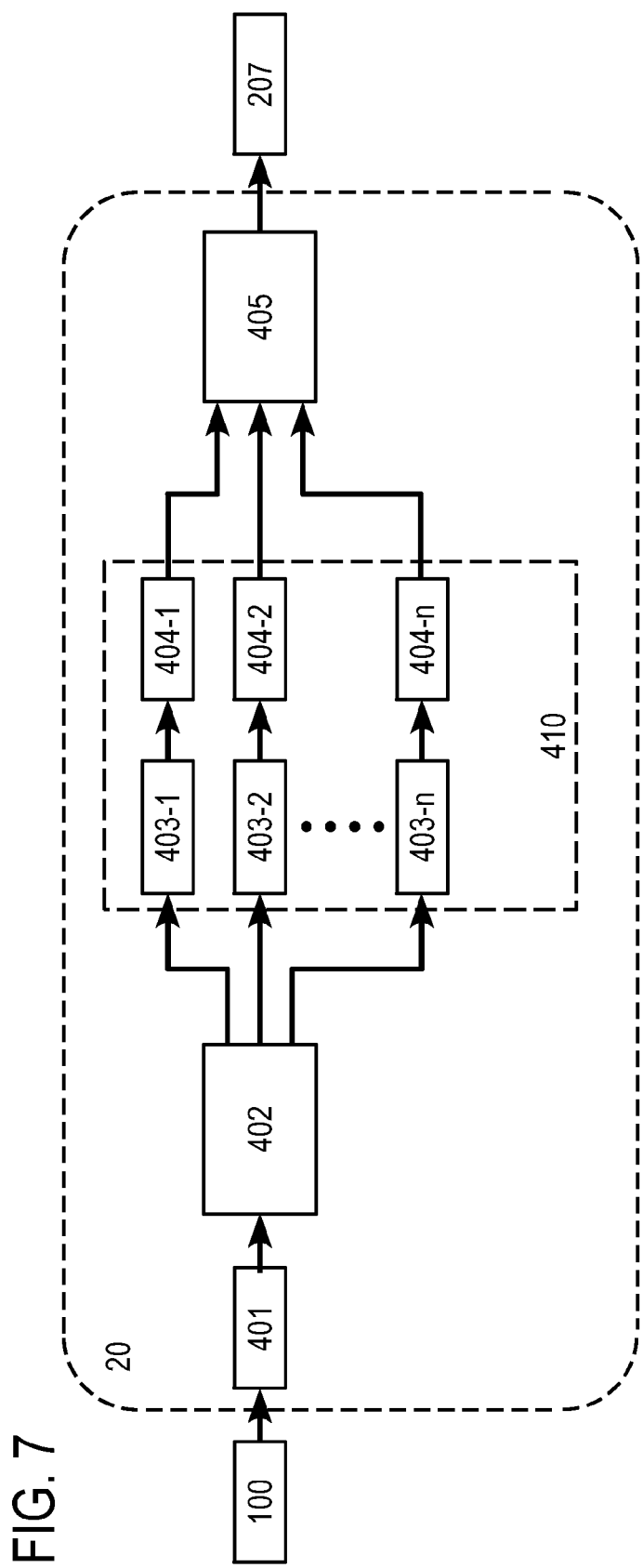

FIG. 7 shows yet another example unit for analog processing 20, where a bank 410 of parallel band-pass filters 403-1 to 403-n, and variable gain amplifier 404-1 to 404-n is used as an alternative of sequential sweeping of tunable band pass filer 203 in earlier embodiments. All the band pass filters 403-n have slightly shifted central frequency in order to cover the whole range of OCT frequency of interest and the variable gain amplifiers 404-n are also designed according to the frequency range covered by the 403-n. A signal divider 402 is used to divide the signal from OCT engine 100 boosted by pre-amplifier 401. The output of signal divider 402 is fed into various parallel channels of bank 410 and combined back by signal combiner 405. An analog-to-digital converter 207 converts the output of signal combiner 405 to a digital signal.

Figure 8:
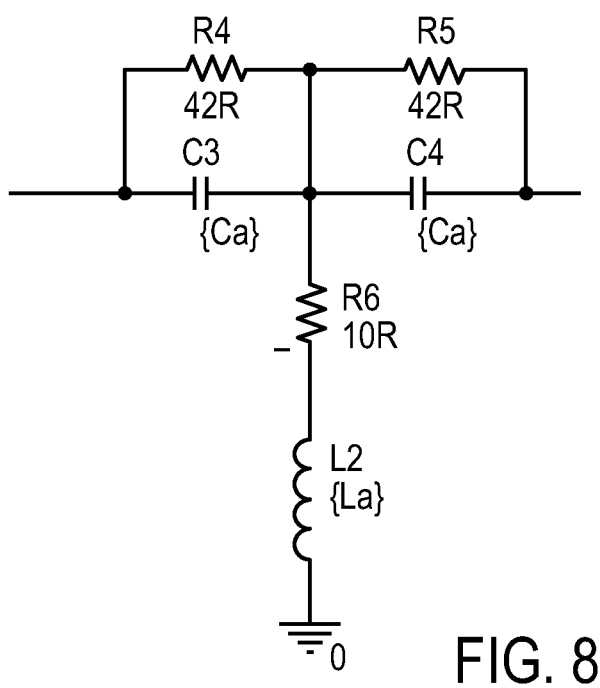
FIG. 8 shows an implementation of an analog high pass filter

FIG. 8 shows an example implementation of an analog high pass filter. The parameters are La=2.7 μH, Ca=Cb=470 pF. In this example, the gain up to about 100 kHz is −20 dB, while it is 0 dB above 100 MHz. This filter would become tunable if its parameters were adjustable.

Figure 9A:
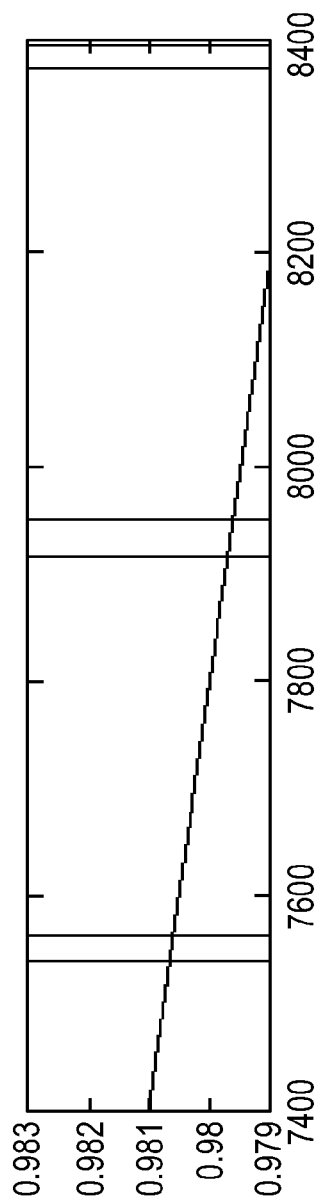
FIGS. 9A and 9B show a perfect and an actual wavenumber-vs-time characteristic from an akinetic laser
Figure 9B:
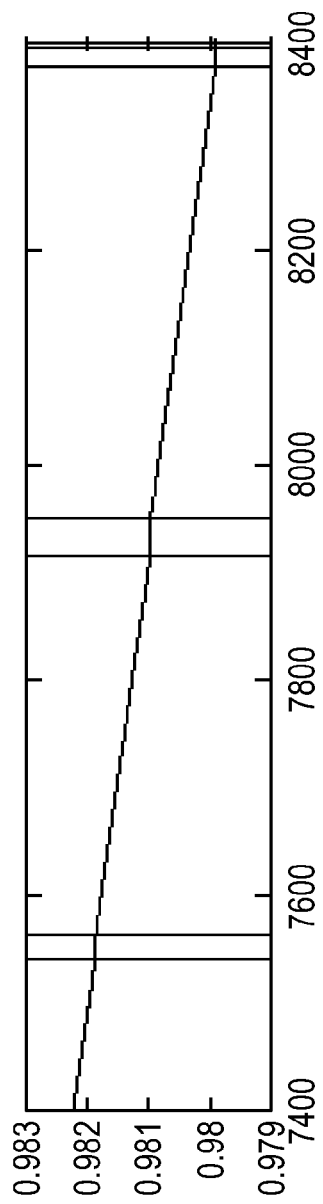

FIG. 9 shows a perfect (FIG. 9A) and an actual (FIG. 9B) wavenumber-vs-time characteristic from an akinetic laser. The y-axis in both subfigures shows a multiple of wavenumber, while the x-axis shows sample number. Every sample is equidistant in time. In the regions indicated by vertical lines, the laser cannot make an instantaneous transition to the next wavenumber, so effectively the wavenumber transition in the zone takes longer time. During this time, the wavenumber of the emitted light is constant.

The zones of wavenumber transitions are generally known from a calibration step of the laser. Usually, the samples obtained during the extended transitions, also called hold points, are removed after the digitization and before the Fourier transform step in the OCT image generation. With the present invention, the signal is additionally filtered before digitization. Nonetheless, one can remove the samples obtained during extended transitions in the same manner, as long as the filter preserves frequencies smaller than the frequency with which wavenumbers are generated. In this situation, within one sample clock period a valid sinusoidal wave signal transitions into or out of a time zone with an extended wavenumber transition.

The invention claimed is:

1. A swept-source optical coherence tomography system for recording sub-surface structure of an analyzed object, said optical coherence tomography system comprising:
    a swept light source configured for generating coherent light with a wavenumber varying with time, where the swept light source comprises a laser that has an approximately periodically linear wavenumber-vs-time characteristic over each sweep;
    an interferometric system configured for splitting the generated light onto a reference arm and a sample arm, where the sample arm is for projecting light onto and receiving light from the analyzed object, and where the received light interferes with light returning from the reference arm to produce an interference signal;
    a photo-detector configured for recording a photo-detector signal in response to the interference signal, wherein the photo-detector signal includes a first component and a second component, wherein the first component has a higher frequency than the second component;
    a signal processing unit comprising a variable gain amplifier configured for selectively amplifying a selected frequency window of the recorded photo-detector signal, wherein the gain of the variable gain amplifier is selected to be proportional to the frequency such that the first component of the signal is amplified more than the second component, and for generating a digitized signal from the selectively amplified photo-detector signal, the signal processing unit further comprising at least one band pass filter or at least one high pass filter; and
    a data processing unit configured for calculation of at least one A scan from the digitized signal.

2. The optical coherence tomography system according to claim 1, wherein the signal processing unit comprises an analog processing unit configured for analog processing of the photo-detector signal, where the analog processing unit comprises at least one tunable band pass filter.

3. The optical coherence tomography system according to claim 2, wherein the signal processing unit comprises a digitizer configured for digitizing the analog processed photo-detector signal.

4. The optical coherence tomography system according to claim 1, where the data processing unit is configured for computing the at least one A scan as a weighted sum of Fourier transforms of the digitized signal.

5. The optical coherence tomography system according to claim 1, where the data processing unit is configured for computing the at least one A scan as a weighted series of readings of the digitized signal.

6. The optical coherence tomography system according to claim 4, where the weights are determined from gain values of the variable gain amplifier.

7. The optical coherence tomography system according to claim 1, comprising a precision amplifier to boost up the photo-detector signal before the photo-detector signal is processed by the signal processing unit.

8. The optical coherence tomography system according to claim 2, comprising an oscillator that generates a signal with at least approximately the same frequency as the frequency of the band pass filter.

9. The optical coherence tomography system according to claim 2, where the tunable band pass filter is tuned to different mid-point frequencies either continuously or sequentially.

10. The coherence tomography system according to claim 2, where the tunable high pass filter is tuned to different corner frequencies either continuously or sequentially.

11. The optical coherence tomography system according to claim 2, where the variable gain amplifier is controlled by a control unit.

12. The optical coherence tomography system according to claim 11, where the control unit control further is configured for controlling the tunable band pass or high pass filter.

13. The optical coherence tomography system according to claim 2, comprising multiple pairs of band pass or high pass filters and variable-gain amplifiers, with all pairs operating in parallel.

14. The optical coherence tomography system according to claim 1, wherein the interferometric system comprises a beam splitter for splitting the generated light into the reference arm and the sample arm.

15. A method for obtaining an A scan of an analyzed object using swept-source optical coherence tomography, said method comprising:
    generating swept-wavenumber coherent light having an approximately periodically linear wavenumber-vs-time characteristic over each sweep and splitting the light into a sample arm and a reference arm;
    projecting a probe beam of the generated light onto the analyzed object and receiving light reflected from the analyzed object using the sample arm;
    producing an interference signal by providing that the received light interferes with light returning from the reference arm;
    using a photo-detector to record a photo-detector signal in response to the interference signal, wherein the photo-detector signal includes a first component and a second component, wherein the first component has a higher frequency than the second component;
    using at least one band pass filter or at least one high pass filter and a variable gain amplifier to selectively amplify a selected frequency window of the recorded photo-detector signal, wherein the gain of the variable gain amplifier is selected to be proportional to the frequency such that the first component of the signal is amplified more than the second component, and generating a digitized signal from the selectively amplified photo-detector signal; and
    calculating at least one A scan from the digitized signal.

16. The method according to claim 15, wherein selectively amplifying comprises analog processing of the recorded photo-detector signal using an analog processing unit comprising at least one tunable band pass or high pass filter, and digitizing the analog processed photo-detector signal.

17. The optical coherence tomography system according to claim 1, wherein the high pass filter is tunable.

18. The method according to claim 15, wherein the high pass filter is tunable.

* * * * *